United States Patent
Patel et al.

(10) Patent No.: US 9,239,761 B2
(45) Date of Patent: *Jan. 19, 2016

(54) STORAGE SYSTEM FORMAT FOR TRANSACTION SAFE FILE SYSTEM

(75) Inventors: Sachin Patel, Bellevue, WA (US); Yadhu Gopalan, Redmond, WA (US); Andrew Rogers, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 760 days.

This patent is subject to a terminal disclaimer.

(21) Appl. No.: 13/210,130

(22) Filed: Aug. 15, 2011

(65) Prior Publication Data

US 2011/0302142 A1 Dec. 8, 2011

Related U.S. Application Data

(63) Continuation of application No. 12/774,752, filed on May 6, 2010, now Pat. No. 8,001,165, which is a continuation of application No. 11/653,588, filed on Jan. 16, 2007, now Pat. No. 7,747,664.

(51) Int. Cl.
    G06F 17/30 (2006.01)
    G06F 11/14 (2006.01)

(52) U.S. Cl.
    CPC .................................. G06F 11/1435 (2013.01)

(58) Field of Classification Search
    CPC ...................... G06F 17/30091; G06F 17/30138
    See application file for complete search history.

(56) References Cited

U.S. PATENT DOCUMENTS

| | | | |
|---|---|---|---|
| 5,086,502 A | 2/1992 | Malcolm | |
| 5,201,044 A | 4/1993 | Frey, Jr. et al. | |
| 5,297,148 A | 3/1994 | Harari et al. | |
| 5,371,885 A * | 12/1994 | Letwin | 707/999.205 |
| 5,469,562 A | 11/1995 | Saether | |
| 5,537,636 A | 7/1996 | Uchida et al. | |
| 5,546,389 A | 8/1996 | Wippenbeck et al. | |
| 5,574,907 A | 11/1996 | Jernigan, IV et al. | |
| 5,699,548 A | 12/1997 | Choudhury et al. | |
| 5,715,455 A * | 2/1998 | Macon et al. | 707/999.001 |
| 5,732,268 A | 3/1998 | Bizzarri | |
| 5,734,340 A | 3/1998 | Kennedy | |
| 5,778,168 A | 7/1998 | Fuller | |
| 5,813,011 A | 9/1998 | Yoshida et al. | |
| 5,825,734 A | 10/1998 | Igarashi et al. | |
| 5,832,515 A | 11/1998 | Ledain et al. | |

(Continued)

OTHER PUBLICATIONS

"Microsoft Press Computer Dictionary Third Edition, "fragmentation", Microsoft Press", 1997, p. 206, p. 1.

(Continued)

*Primary Examiner* — Khanh Pham
(74) *Attorney, Agent, or Firm* — Sunah Lee; Kate Drakos; Micky Minhas

(57) ABSTRACT

A transaction safe file system uses two sets of file allocation tables and bitmap images to perform file modifications on one of the sets while the other set remains a last known good set. After a modification is complete, a pointer is changed to the newly modified set, and the newly modified set becomes the last known good set. The sets are then synchronized. The file allocation table is used to define cluster chains while the bitmap image is used to determine if a cluster is free or not. In some operations, only the bitmap image may need to be manipulated. The file system may be used in a transaction safe mode as well as a non-transaction safe mode.

21 Claims, 6 Drawing Sheets

(56) References Cited

U.S. PATENT DOCUMENTS

| | | | |
|---|---|---|---|
| 5,850,506 | A | 12/1998 | Gordons |
| 5,907,672 | A | 5/1999 | Matze et al. |
| 5,983,240 | A | 11/1999 | Shoroff et al. |
| 6,023,744 | A | 2/2000 | Shoroff et al. |
| 6,032,223 | A | 2/2000 | Beelitz |
| 6,037,738 | A | 3/2000 | Morita et al. |
| 6,049,807 | A | 4/2000 | Carroll et al. |
| 6,078,999 | A | 6/2000 | Raju et al. |
| 6,108,759 | A | 8/2000 | Orcutt et al. |
| 6,192,432 | B1 | 2/2001 | Slivka et al. |
| 6,205,558 | B1 | 3/2001 | Sobel |
| 6,253,300 | B1 * | 6/2001 | Lawrence et al. ............. 711/173 |
| 6,286,113 | B1 | 9/2001 | Sembach et al. |
| 6,374,268 | B1 | 4/2002 | Testardi |
| 6,377,958 | B1 | 4/2002 | Orcutt |
| 6,378,031 | B1 | 4/2002 | Kuno et al. |
| 6,470,345 | B1 | 10/2002 | Doutre et al. |
| 6,510,552 | B1 | 1/2003 | Benayoun et al. |
| 6,529,966 | B1 | 3/2003 | Willman et al. |
| 6,571,259 | B1 | 5/2003 | Zheng et al. |
| 6,594,725 | B2 | 7/2003 | Ando et al. |
| 6,615,365 | B1 | 9/2003 | Jenevein et al. |
| 6,615,404 | B1 | 9/2003 | Garfunkel et al. |
| 6,658,437 | B1 | 12/2003 | Lehman |
| 6,662,309 | B2 | 12/2003 | Ando et al. |
| 6,675,180 | B2 | 1/2004 | Yamashita |
| 6,792,518 | B2 | 9/2004 | Armangau et al. |
| 6,856,993 | B1 | 2/2005 | Verma et al. |
| 6,883,114 | B2 | 4/2005 | Lasser |
| 6,907,184 | B1 | 6/2005 | Yokota et al. |
| 6,922,708 | B1 | 7/2005 | Sedlar |
| 7,051,251 | B2 | 5/2006 | Moore et al. |
| 7,062,602 | B1 | 6/2006 | Moore et al. |
| 7,089,448 | B2 | 8/2006 | Hinshaw et al. |
| 7,174,420 | B2 | 2/2007 | Malueg et al. |
| 7,246,139 | B2 | 7/2007 | Andoh |
| 7,363,540 | B2 | 4/2008 | Patel et al. |
| 7,613,738 | B2 | 11/2009 | Patel et al. |
| 7,685,171 | B1 | 3/2010 | Beaverson et al. |
| 7,747,664 | B2 | 6/2010 | Patel et al. |
| 8,001,165 | B2 | 8/2011 | Patel et al. |
| 8,024,383 | B2 | 9/2011 | Patel et al. |
| 8,024,507 | B2 | 9/2011 | Patel et al. |
| 8,156,165 | B2 | 4/2012 | Malueg et al. |
| 2001/0016841 | A1 | 8/2001 | Karasudani |
| 2001/0054129 | A1 | 12/2001 | Wouters |
| 2002/0152354 | A1 | 10/2002 | Harmer |
| 2002/0181136 | A1 * | 12/2002 | Denda et al. .................... 360/69 |
| 2003/0028765 | A1 | 2/2003 | Cromer et al. |
| 2003/0233385 | A1 | 12/2003 | Srinivasa et al. |
| 2004/0030847 | A1 | 2/2004 | Tremaine |
| 2004/0078704 | A1 * | 4/2004 | Malueg et al. ................. 714/42 |
| 2004/0210706 | A1 | 10/2004 | In et al. |
| 2004/0250172 | A1 * | 12/2004 | Patel et al. ...................... 714/42 |
| 2005/0027746 | A1 | 2/2005 | Lin et al. |
| 2005/0060316 | A1 | 3/2005 | Kamath et al. |
| 2006/0020745 | A1 | 1/2006 | Conley et al. |
| 2007/0136387 | A1 | 6/2007 | Malueg et al. |
| 2007/0226445 | A1 | 9/2007 | Nichols et al. |
| 2007/0239957 | A1 | 10/2007 | Lin |
| 2008/0082774 | A1 * | 4/2008 | Tomlin et al. ................. 711/170 |
| 2008/0172425 | A1 | 7/2008 | Patel et al. |
| 2008/0172426 | A1 | 7/2008 | Patel et al. |
| 2008/0177939 | A1 | 7/2008 | Patel et al. |
| 2010/0049776 | A1 | 2/2010 | Patel et al. |
| 2010/0217788 | A1 | 8/2010 | Patel et al. |
| 2012/0011177 | A1 | 1/2012 | Patel et al. |
| 2012/0011179 | A1 | 1/2012 | Patel et al. |

OTHER PUBLICATIONS

"Microsoft Press Computer Dictionary Third Edition, "flush", Microsoft Press", 1997, p. 202, p. 1.

Jonge, Wiebren DE., "The Logical Disk: A New Approach to Improving File Systems", Retrieved at <<citeseerx.ist.psu.edu/viewdoc/download?doi=10.1.1.54.9535&rep . . . >>, In Proceedings of the fourteenth ACM symposium on, Operating systems principles, Dec. 5-8, 1993, pp. 14.

Farr, et al., "An Optimum Disc Organization for a Virtual Memory System", Computer Design, Jun. 1971, pp. 49-54.

Lee, Chiung-San., "Server-Based Maintenance Approach for Computer Classroom Workstations", IEICE Transaction Information System, vol. E83-D, No. 4, Apr. 2000, pp. 807-814.

"Transactional file access", Retrieved at <<http://jakarta.apache.org/commons/transaction/file/index.html>>, Date: Jun. 2, 2005, p. 1.

Rich Amy., "ZFS, Sun's Cutting-Edge File System (Part 1: Storage Integrity, Security, and Scalability)", Retrieved at <<http://www.sun.com/bigadmin/features/articles/zfs_part1.scalable.html#transaction>>, Aug. 2006, pp. 8.

Chen, et al., "The Rio File Cache: Surviving Operating System Crashes", Retrieved at <<http://www.cs.ucsd.edu/classes/wi01/cse221/chen,ng,rajaman i,aycock.the_rio-fi le_cache.surviving_operating_system_crashes.pdf>>, Proceedings of the seventh international conference on Architectural support for programming languages and operating systems, Oct. 1-4, 1996, pp. 1-11.

Kashyap, Aditya., "File System Extensibility and Reliability Using an in-Kernel Database", Retrieved at <<http://www.am-utils.org/docs/kbdbfs-msthesis/index.html>>, Technical Report FSL-04-06, Dec. 2004, pp. 30.

Barreto, et al., "A Highly Available Replicated File System for Resource-Constrained Windows CE .Net Devices", Retrieved at <<http://www.gsd.inesc-id.pt/~jpbarreto/bib/HaddockFS_DotNetTechs05.pdf>>, In 3rd International Conference on .NET Technologies, May 2005, pp. 6.

"Transaction-Safe FAT File System", Retrieved at <<http://msdn.microsoft.comllibrary/default.asp?url=/library/en-uslwcemain4/htmllcmcontransaction-safefatfilesystem.asp, Date: May 30, 2006, p. 1.

Otoo, et al., "Non-shared disk cluster—a fault tolerant, commodity approach to hi-bandwidth data analysis", Retrieved at <<http://scholar.google.comlscholar?hl=en&lr=&q=cache:rptl-5auhxOJ:WNW.ihep.aC.cn/-chep01/paper/4-026.pdf>>, Sep. 2001, pp. 7.

Sivathanu et al., "Life or Death at Block-Leve", Retrieved at <<https:/I'vWvW.usenix.org/publicationsllibraty/proceedingslosdi04/tech/fulLpaperslsivathanulsivathanu.pdf>>, Proceedings of the 6th conference on Symposium on Opearting Systems Design & Implementation, vol. 6, Dec. 2004, pp. 379-394.

* cited by examiner

STORAGE SYSTEM FORMAT FOR TRANSACTION SAFE FILE SYSTEM

CROSS-REFERENCE TO RELATED APPLICATIONS

This application claims priority to and is a continuation of U.S. patent application Ser. No. 12/774,752, entitled "Storage System Format for Transaction Safe File System," which was filed on May 6, 2010, and issued as U.S. Pat. No. 8,001,165 on Aug. 16, 2011, and is a continuation of U.S. patent application Ser. No. 11/653,588, filed on Jan. 16, 2007, and issued as U.S. Pat. No. 7,747,664 on Jun. 29, 2010. These applications are incorporated herein by reference in their entirety.

BACKGROUND

Data on storage systems such as disk drives, flash memory, and other data storage devices are often arranged in a file system. The file system enables easy access to data on the storage system by organizing the data into files and defining the location of the files on the storage system. In some such systems, the files may be arranged in a hierarchical fashion using directories and subdirectories. The data contained in the files may be any type of storable information in any type of format.

Many file systems use a file allocation table otherwise known as FAT. The FAT may be used differently in various applications. In some applications, a FAT may be used to link various clusters of data together into a file that is comprised of several such clusters.

As file systems have become more and more complex, some operations performed on the file system may take several steps. The file system may be vulnerable to corruption if a power disruption or other interruption occurs during such steps and before they are complete.

SUMMARY

A transaction safe file system uses two sets of file allocation tables and bitmap images to perform file modifications on one of the sets while the other set remains a last known good set. After a modification is complete, a pointer is changed to the newly modified set, and the newly modified set becomes the last known good set. The sets are then synchronized. The file allocation table is used to define cluster chains while the bitmap image is used to determine if a cluster is free or not. In some operations, only the bitmap image may need to be manipulated. The file system may be used in a transaction safe mode as well as a non-transaction safe mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
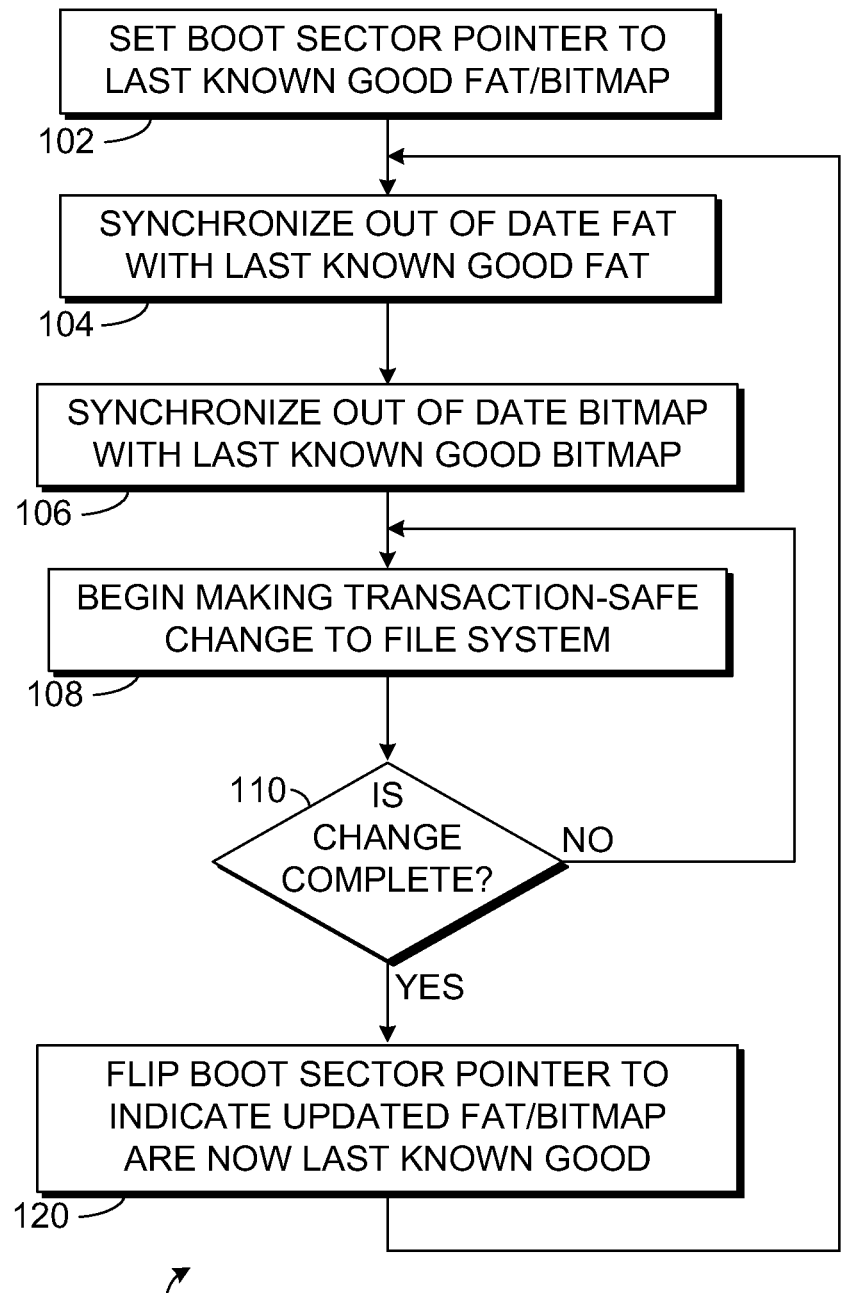
FIG. 1 is a flowchart illustration of an embodiment showing a method for transaction-safe file modification.

In order to perform transaction safe modifications to a file system, one set of file allocation tables and bitmap images are modified while another set is kept as a last known good set. Once a modification is complete, a flag is set to indicate that the modified set is now the last known good set. If a power outage or other disruption occurs while the modification is in progress but before the flag is set, the changes will be lost but the file system will be intact because the last known good set of file allocation tables and bitmap images will be current.

In some operations, a modification to the data may require a change to the bitmap image and not the file allocation table. An example of such an operation is the deletion of a file.

The transaction safe modification occurs by performing the steps required to make the modification, with the last step being an atomic change of a single flag. Such a system may be useful in any application where power failure may be problematic. For example, removable storage media in a consumer product such as a data storage card in a camera, video recorder, or other product may be subject to instantaneous disconnection by a user during read, write, or other modification action.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a method for a transaction-safe file modification. In block 102, a boot sector pointer is set to the last known good file allocation table ('FAT') and bitmap image of cluster usage. An out of date FAT is updated to the last known good FAT in block 104. Similarly, the last known good bitmap image is used to update an out of date bitmap image in block 106. Changes to the file system are begun in block 108. If the change is not complete in block 110, the process returns to block 108 and further changes are made. If the changes are complete in block 110, the boot sector pointer is flipped to indicate that the changed FAT and bitmap images are now the last known good versions. The process continues in block 104.

Embodiment 100 is a method by which transaction-safe file modifications may be performed and then completed by toggling a pointer to the updated FAT and bitmap images. The toggling operation in block 120 may be an atomic operation that commits the entire transaction. Prior to toggling the boot sector pointer in block 120, the file system may be operational in the last known good state.

When a modification is performed to the file system, the changes may be made to areas of the file system that are open. For example, a new file may be added by writing to clusters that are unused and by referencing those clusters in the modified FAT and bitmap image. After all of the changes that relate to the modification, such as writing the new clusters on the storage media, changing the FAT, modifying the bitmap image, updating directories, etc, the change is made complete by toggling the boot sector flag that points to the newly modified FAT and bitmap.

In some embodiments, the FAT and bitmap structure used to describe a file system may be used in a non-transaction safe manner. For example, an application or operating system that references a file system in a non-transaction safe manner may update a single set of FAT and bitmap image, while a transaction safe application or operating system may read and write the same data storage system but use two sets of FAT and bitmap image. The transaction safe application or operating system may keep the sets of FAT and bitmap image synchronized so that a non-transaction safe application or operating system may read and write without error.

Figure 2:
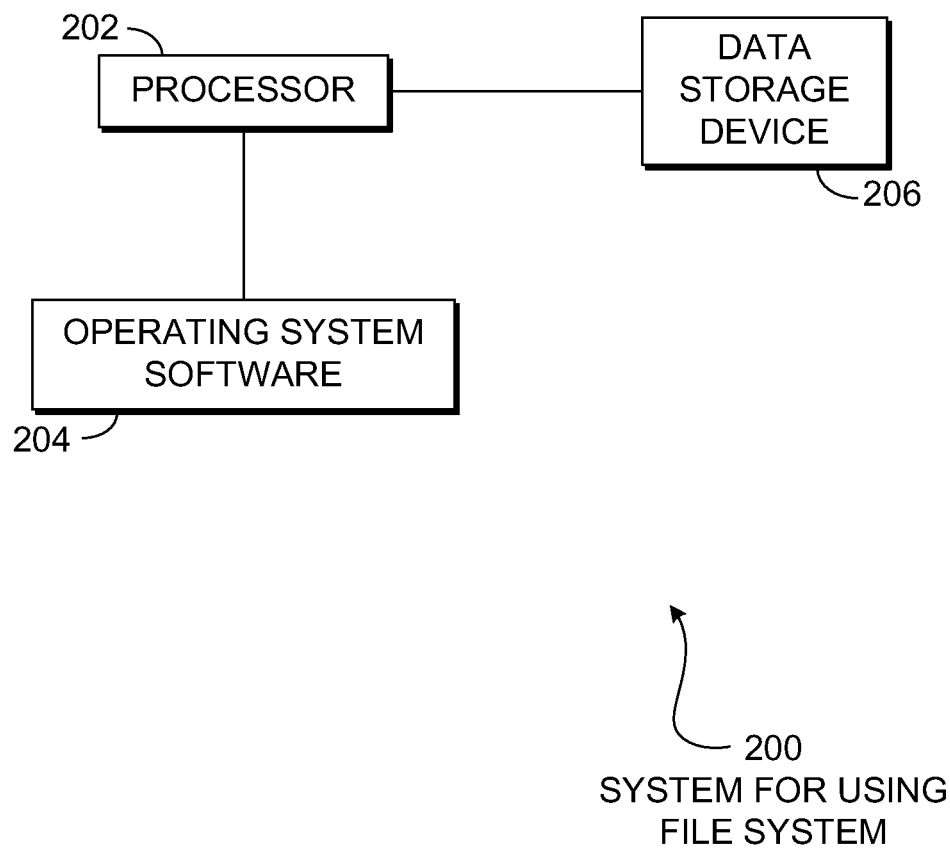
FIG. 2 is a diagram illustration of an embodiment showing a system for using a file system.

FIG. 2 illustrates an embodiment 200 of a system for using a file system. A processor 202 uses operating system software 204 to read and write data from a data storage device 206.

The embodiment 200 may be any type of computing device, from a server computer to a personal computer or handheld device such as a cellular telephone, digital camera, personal digital assistant, video recording device, or any other device that stores data using a file system.

In many cases, the data storage device 206 may be a removable data storage device. For example, the data storage device 206 may be a hot swappable hard disk drive, solid state memory stick, a Universal Serial Bus ('USB') attached data storage device, memory card, or any other removable data storage device. In other cases, the data storage device 206 may generally be a non-removable device but a user may desire to have protection from power surges, brownouts, or unexpected power failures.

The processor 202 may be any type of computational device. In some cases, the processor 202 may be a state machine, gate array, specialized processor, or other type of logic device, or the processor 202 may be a general purpose processor capable of executing various instructions.

The operating system software 204 may be software that is executed by a general purpose processor 202, or may be built-in logic in a hardware state machine such as a gate array. In some instances, the operational logic may be a set of processor instructions that are stored on the data storage device 206 or on some other data storage device such as a programmable read only memory device, including those that are erasable as well as those that are not.

Figure 3:
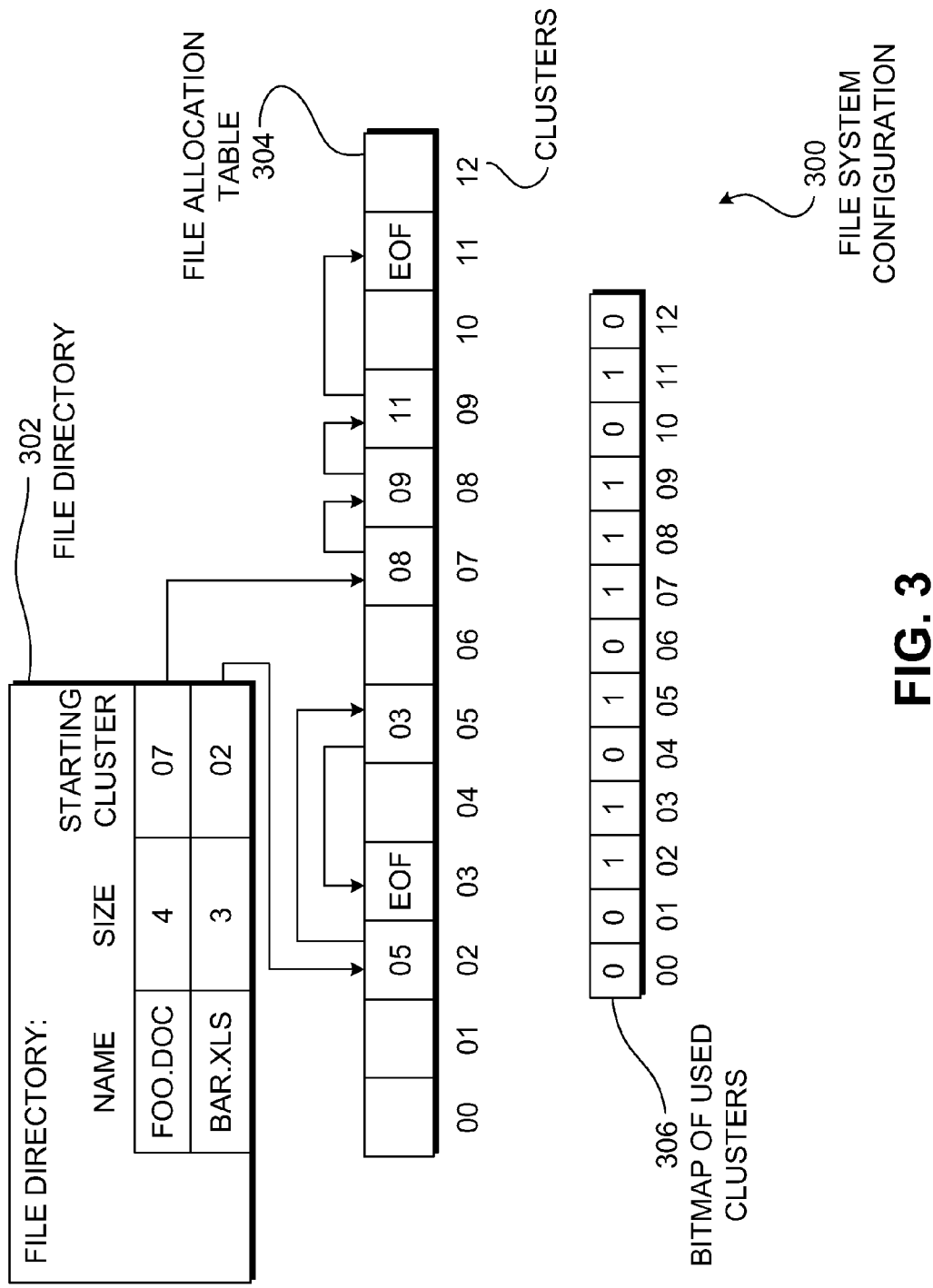
FIG. 3 is a diagram illustration of an embodiment showing a file system configuration.

FIG. 3 is an illustration of an embodiment 300 showing a file system configuration. Embodiment 300 will be the basis of examples discussed later in this specification. The file system comprises a file directory 302 that contains two files, foo.doc of a file size 4 and starting cluster 07, and bar.xls with a file size 3 and starting cluster 03. The file sizes are given in number of clusters of storage space in this example.

The file allocation table 304 contains the sequence of clusters allocated for each file. Each register in the file allocation table 304 represents a cluster of data storage space, and the address stored within each register is the next cluster in sequence for that particular file. An EOF designation in a register means that the end of file has been reached. In this example, bar.xls begins in cluster 02, then clusters 05 and 03 where the EOF has been reached. Similarly, foo.doc begins in cluster 07, then sequences through clusters 09 and 11 before reaching EOF at cluster 11.

The bitmap image 306 designates the clusters that are allocated. As with the file allocation table 304, each register within the bitmap image 306 represents a specific cluster in the data storage media and corresponds with the file allocation table 304. In the present example, a single bit is used to represent whether the particular cluster is being used, with a 0 indicating that the cluster is unused and a 1 indicating that the cluster is used. The bitmap 306 indicates that clusters 02, 03, 05, 07, 08, 09, and 11 are allocated, which corresponds with the manner in which files foo.doc and bar.xls are stored.

In some embodiments, a contiguous bit may be added to a directory entry for a file. The contiguous bit may be used to indicate that the clusters assigned to a file are contiguous. Thus, a file may be described by a starting cluster and total number of clusters when the file is contiguous. In such cases, the bitmap 306 may be used to indicate that the clusters are assigned for the contiguous file, but the file allocation table 304 may not be referenced or updated.

Figure 4:
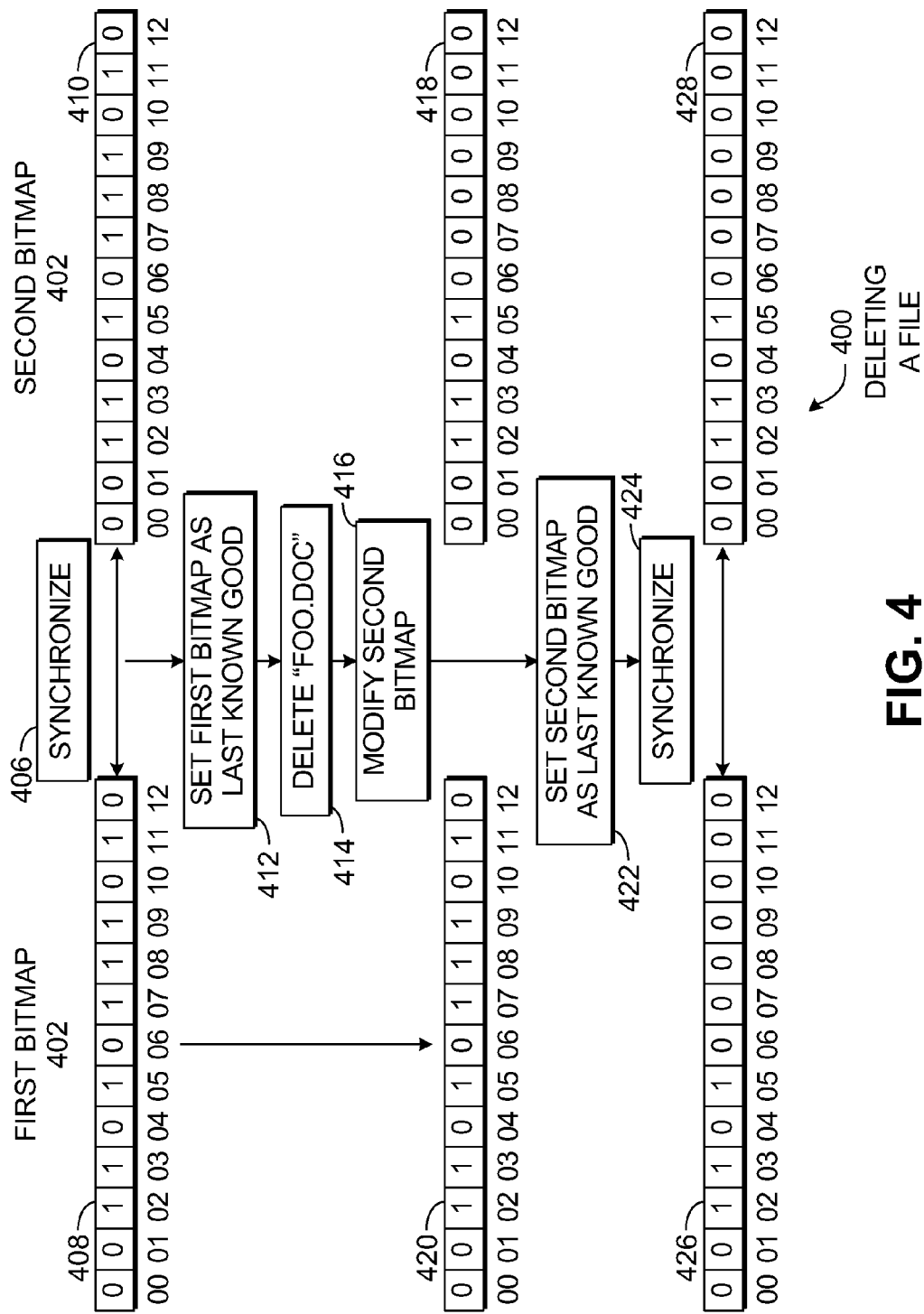
FIG. 4 is a timeline diagram of an embodiment showing a process for deleting a file.

FIG. 4 is a timeline illustration of an embodiment 400 of a sequence of steps that may be used for deleting a file. Embodiment 400 illustrates an example of deleting the file 'foo.doc' from embodiment 300 illustrated in FIG. 3.

A first bitmap 402 is illustrated on the left side while a second bitmap 404 is illustrated on the right side. The two bitmap images are synchronized in block 406, resulting in identical bitmaps 408 and 410. The first bitmap is set as last known good in block 412. An operation to delete foo.doc is initiated in block 414.

In addition to any changes made to directory listings, the result of the delete operation is that second bitmap is modified in block 416, resulting in a second bitmap image 418. The second bitmap image 418 has blocks 08, 09, and 11 set to 0, indicating that the blocks 08, 09, and 11 are unused. In practice, a bitmap image may be used to indicate whether or not a cluster is used or unused, regardless what the file allocation table indicates or whether data are actually stored in the clusters.

After all the modifications to the file system are complete, the final step may be to set the second bitmap image as last known good in block 422. At this stage, the file system will operate using the bitmap image 418 and the space formerly allocated to foo.doc will be free for overwriting. In block 424, the bitmap images are synchronized, resulting in the first bitmap image 426 being synchronized to the second bitmap image 428.

The embodiment 400 illustrates an atomic operation for a change to the file system that involves only the bitmap images. Two copies of a bitmap image are used: one that represent the last known good bitmap image and a second that is modified during the processing of the transaction. After all changes are finalized for the transaction, a single operation of setting the second bitmap image as last known good will commit the transaction. After the transaction is committed, the two bitmap images are synchronized and the process may be repeated.

Figure 5:
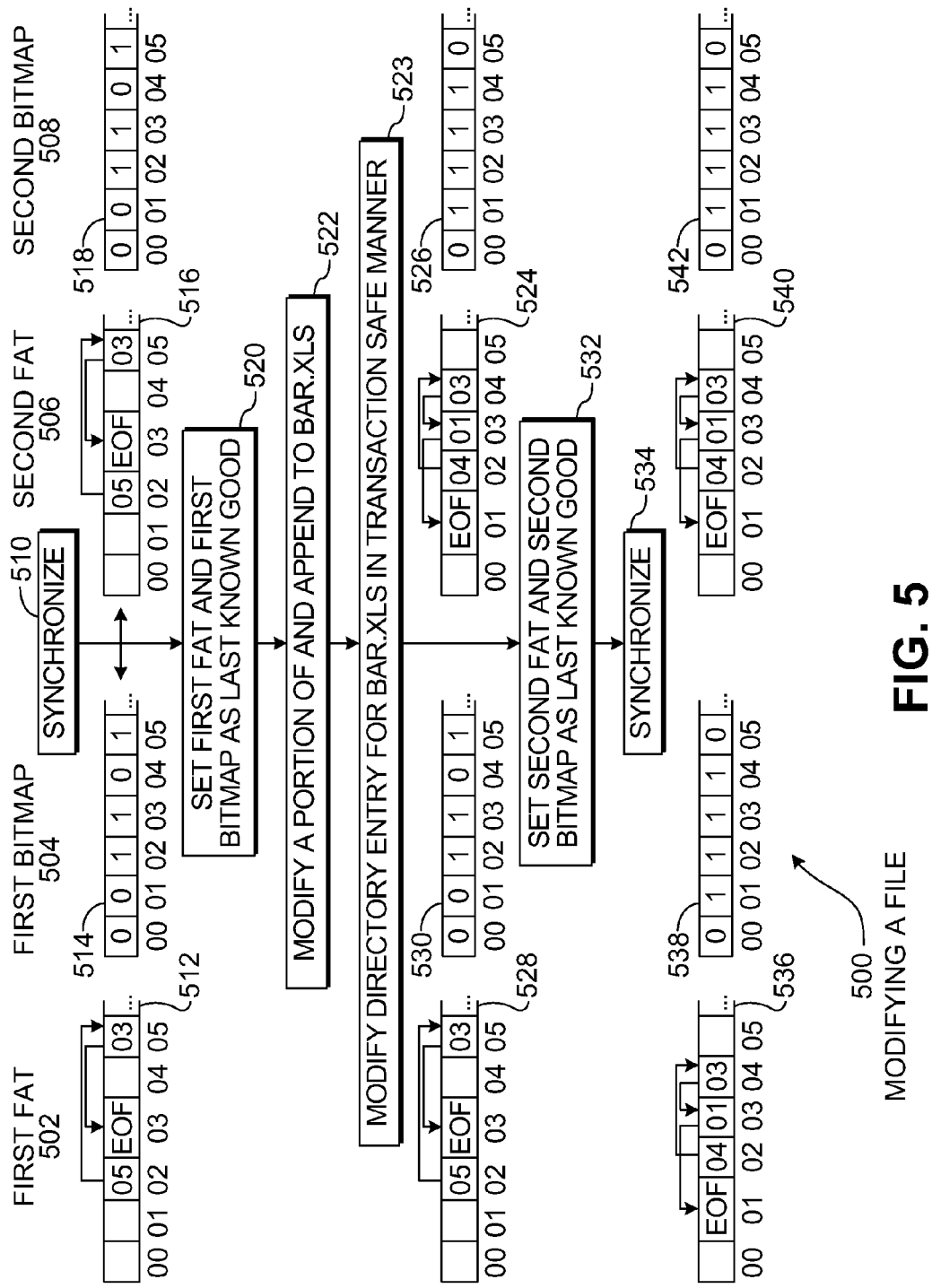
FIG. 5 is a timeline diagram of an embodiment showing a process for modifying a file.

FIG. 5 illustrates an embodiment 500 showing a sequence for modifying a file. Embodiment 500 is a timeline sequence illustrating the modification of bar.xls from embodiment 300 shown in FIG. 3.

A first FAT 502 and a first bitmap 504 are shown in the left side while a second FAT 506 and second bitmap 508 are shown on the right. The FATs and bitmaps are synchronized in block 510, resulting in identical FATs 512 and 516 and bitmaps 514 and 518. For the purposes of illustration, only a portion of the FATs and bitmaps are shown.

The first set of FAT/bitmap is set as last known good in block 520.

A portion of bar.xls is modified in block 522, resulting in changes to the second FAT 524 and second bitmap 526. Meanwhile, the first FAT 528 and first bitmap 530 remain unchanged.

The changes to bar.xls involved modifying one cluster of the file, specifically cluster 05, and appending a cluster. In performing the change, a new cluster 04 was used in place of the previous cluster 05 and cluster 01 was appended. In this example, the change to cluster 05 may involve changing the value of a portion of the data. The change may be implemented by copying the contents of cluster 05 into previously unused cluster 04, and modifying the data as required. The data in clusters 02 and 03 may remain unchanged.

This change resulted in modifications to both the FAT 524 and bitmap 526. The bitmap 526 reflects the changes that cluster 04 is now in use and cluster 05 is now free. The bitmap 526 further reflects the change that cluster 01 has been appended and is also now in use. FAT 524 reflects the change that cluster 02 now points to cluster 04 rather than 05, and cluster 04 now points to cluster 03. FAT 524 further reflects the change that cluster 03 now points to cluster 01 which is the new end of file cluster.

Changes to the directory entries are made in a transaction-safe manner in block 523. As part of the modification to the file bar.xls, the length of file has been changed from 3 clusters to 4 clusters, thus the directory entry for bar.xls is modified. Modification of a directory in a transaction-safe manner is performed in a similar manner as the modification to the file bar.xls: a copy of the modified portion of the directory is made in a previously unused portion of the data storage system, the FAT and bitmap images are updated to reflect the modified portion of the directory, and the entire transaction is committed when the last known good flag is toggled.

The second FAT and second bitmap are set as last known good in block 532 and the FATs and bitmaps are synchronized in block 534. The result is that FAT 536 is now identical to FAT 540 and bitmap 538 is identical to bitmap 542.

Embodiment 500 illustrates how a complex file modification transaction may be performed in an atomic fashion. A copy of the last known good file allocation table and bitmap image are used to prepare a transaction prior to committing the transaction in the atomic step of setting the last known good flag for the FAT and bitmap. In performing the changes in an atomic fashion, a file may be modified by copying a cluster of data to an unused cluster and making the modification in the copied location. If the transaction is aborted before setting the flag, the changes would not be saved, but the file system would remain in the last known good state.

In some embodiments, file allocation tables may be very large. In order to speed up the synchronization process for the file allocation table, the portions of the file allocation table that are modified may be identified and tracked so that during synchronization, the identified portions may be overwritten while the remaining portion of the FAT may be left alone. In such an embodiment with very large file allocation tables, the speed of synchronization may be greatly enhanced.

Figure 6:
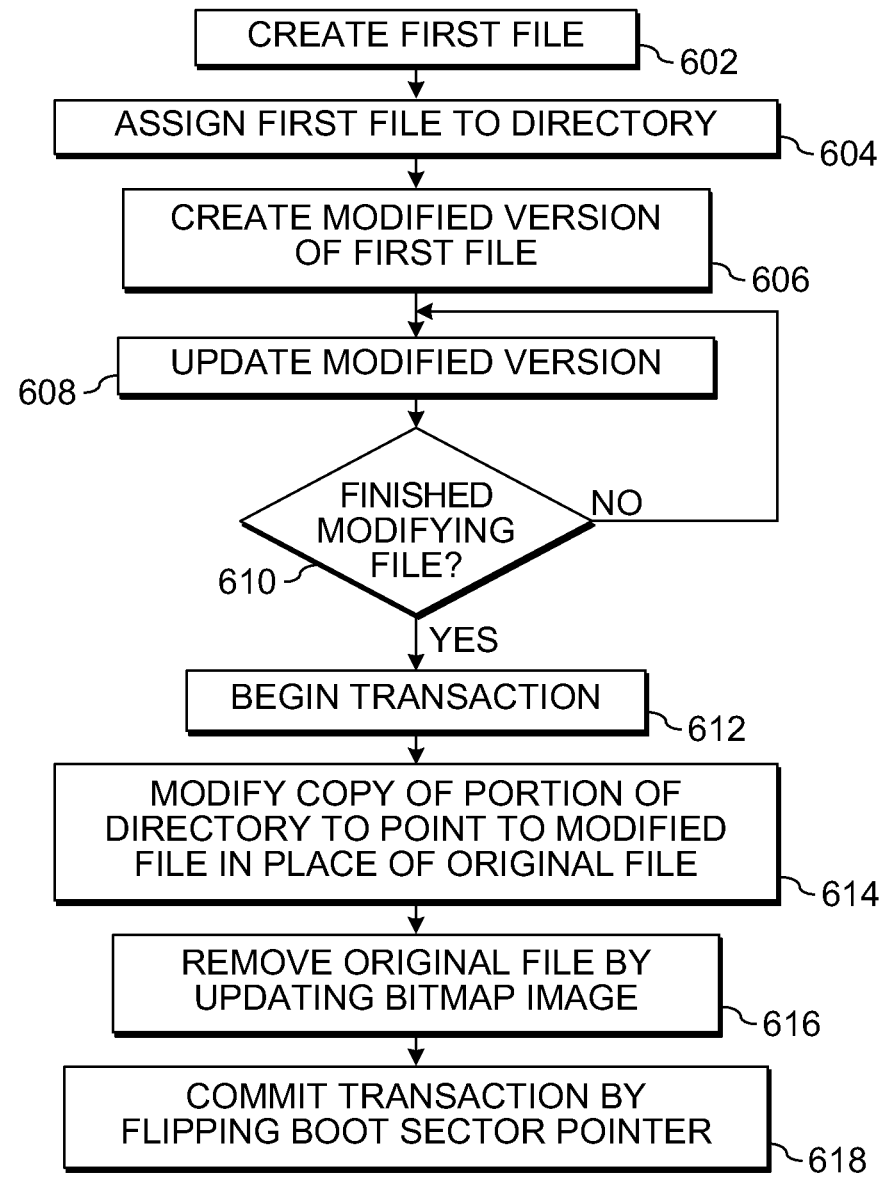
FIG. 6 is a flowchart illustration of an embodiment showing a method for transaction-safe file replacement.

FIG. 6 is a flowchart illustration showing an embodiment 600 of a method for transaction-safe file replacement. A modified version of a file may be created over a period of time. The original file may be replaced by the modified version of the file in a single transaction using a second FAT and bitmap and committed by toggling the boot sector pointer. The embodiment 600 performs a rather complex transaction in a transaction-safe mode with an atomic action. The transaction includes deleting a first file and renaming a second file to have the first name and directory location as the first file.

A first file is created in block 602 and assigned to a directory in block 604. A modified version of the file is created in block 606 and updated in block 608. If the modification is not complete in block 610, more modifications are performed in block 608. When modifications are complete in block 610, a single transaction is begun in block 612. A portion of the directory is copied and modified in block 614 to point to the modified file in place of the original file. The original file is deleted by updating the bitmap image to reflect the deletion in block 616. The entire transaction is committed by the atomic action of flipping the boot sector pointer to the updated FAT and bitmap in block 618.

In embodiment 600, the directory is modified in block 614 in a similar fashion as illustrated in FIG. 5. The directory is treated within the file system as another file, so one or more clusters that make up the directory may be copied to a previously unused location, modified, and then the transaction may be committed.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   storing a first bitmap image associated with a file allocation table of a file system as a last known good bitmap image, the file allocation table defining allocated storage segments in the file system, the first bitmap image configured to store an allocation bit for each of the allocated storage segments in the file system, the allocation bit indicative of whether a respective allocated storage segment is used or unused;
   storing a value indicative that the first bitmap image is the last known good bitmap image;
   synchronizing a second bitmap image to the first bitmap image resulting in the second bitmap image and the first bitmap image identically indicating the allocated storage segments in the file system, wherein the second bitmap image is to be modified and the first bitmap image is to remain unchanged in response to an operation to change the file system being performed;
   changing a portion of the file system by performing at least one act of an operation that comprises a plurality of acts to be performed on the file system;
   modifying the second bitmap image in response to changing the portion of the file system;
   after modifying the second bitmap image, synchronizing the first bitmap image to the second bitmap image resulting in the first and second bitmap images identically indicating the allocated storage segments in the changed file system; and
   subsequent to an interruption prior to completion of all steps of the operation, retaining the first bitmap image as the last known good bitmap image based on the stored value when the interruption occurs before all steps of the operation are complete.

2. The method of claim 1, wherein modifications to the second bitmap image made in response to changing the portion of the file system are not saved when an interruption occurs before all steps of the operation are complete.

3. The method of claim 2, wherein the interruption comprises a power disruption.

4. The method of claim 1, further comprising:
   toggling an indicium to the first bitmap image, and
   committing the operation is in response to toggling the indicium to the first bitmap image.

5. The method of claim 1, wherein changing the portion of the file system comprises at least one of deleting at least a portion of a file in the file system, modifying at least a portion of a file in the file system, and adding a file to the file system.

6. The method of claim 1, wherein changing the portion of the file system is performed in a transaction safe mode.

7. The method of claim 1, wherein:
   the first bitmap image is associated with a first file allocation table, and
   the second bitmap image is associated with a second file allocation table, the second file allocation table comprising a copy of the first file allocation table.

8. The method of claim 7, further comprising indicating the first file allocation table as a last known good file allocation table.

9. The method of claim 8, further comprising:
   modifying the second file allocation table in response to changing the portion of the file system; and
   retaining the first file allocation table as the last known good file allocation table until all steps of the operation are complete.

10. The method of claim 9, wherein modifications made to the second file allocation table in response to changing the portion of the file system are not saved when an interruption occurs before all steps of the operation are complete.

11. A computer-readable storage device comprising computer executable instructions encoded thereon that, when executed by a processing system, cause the processing system to perform acts comprising:
    indicating a first bitmap image associated with a file allocation table of a file system as a last known good bitmap image, the file allocation table defining allocated storage segments in the file system, the first bitmap image including an allocation bit for each of the allocated storage segments in the file system;
    storing a value indicative that the first bitmap image is the last known good bitmap image;
    synchronizing a second bitmap image to the first bitmap image resulting in the second bitmap image and the first bitmap image identically indicating the allocated storage segments in the file system, wherein the second bitmap image is to be modified and the first bitmap image is to remain unchanged in response to an operation to change the file system being performed;
    changing a portion of the file system by performing at least one act of an operation that comprises a plurality of acts to be performed on the file system;
    modifying the second bitmap image in response to changing the portion of the file system;
    after modifying the second bitmap image, synchronizing the first bitmap image to the second bitmap image resulting in the first and second bitmap images identically indicating the allocated storage segments in the changed file system; and
    subsequent to an interruption prior to completion of all steps of the operation, indicating the first bitmap image as the last known good bitmap image based on the stored value in response to the interruption occurring before all steps of the operation are complete.

12. The computer-readable storage device of claim 11, wherein modifications to the second bitmap image made in response to changing the portion of the file system are not saved when the interruption occurs.

13. The computer-readable storage device of claim 11, wherein the interruption comprises a power disruption.

14. The computer-readable storage device of claim 11, wherein:
   indicating the first bitmap image as the last known good bitmap image comprises toggling an indicium to the first bitmap image, and
   the operation is to be committed in response to toggling the indicium to the first bitmap image.

15. The computer-readable storage device of claim 11, wherein changing the portion of the file system comprises at least one of deleting at least a portion of a file in the file system, modifying at least a portion of a file in the file system, and adding a file to the file system.

16. The computer-readable storage device of claim 11, wherein changing the portion of the file system is performed in a transaction safe mode.

17. The computer-readable storage device of claim 11, wherein:
   the first bitmap image is associated with a first file allocation table, and
   the second bitmap image is associated with a second file allocation table, the second file allocation table comprising a copy of the first file allocation table.

18. The computer-readable storage device of claim 17, wherein the acts further comprise indicating the first file allocation table as a last known good file allocation table.

19. The computer-readable storage device of claim 18, wherein the acts further comprise modifying the second file allocation table in response to changing the portion of the file system, wherein the first file allocation table remains as the last known good file allocation table if an interruption occurs before all steps of the operation are complete.

20. The computer-readable storage device of claim 19, wherein modifications made to the second file allocation table in response to changing the portion of the file system are not saved when the interruption occurs.

21. A system comprising:
   a memory storing thereon:
      a file system;
      a first bitmap image associated with a file allocation table of the file system, the file allocation table defining allocated storage segments in the file system, the first bitmap image configured to store an allocation bit for each of the allocated storage segments in the file system, the first bitmap image indicated to be a last known good bitmap image; and
      a second bitmap image comprising a copy of the first bitmap image to identically indicate the allocated storage segments in the file system, wherein the second bitmap image is to be modified and the first bitmap image is to remain unchanged in response to an operation to change the file system being performed; and
   one or more computer storage media storing thereon computer readable instructions that, when executed by a processor, cause the processor to perform acts comprising:
      storing a value indicative that the first bitmap image is the last known good bitmap image;
      changing a portion of the file system by performing at least one act of an operation that comprises a plurality of acts to be performed on the file system;
      modifying the second bitmap image in response to changing the portion of the file system;
      after modifying the second bitmap image, synchronizing the first bitmap image to the second bitmap image resulting in the first and second bitmap images identically indicating the allocated storage segments in the changed file system; and
      subsequent to an interruption prior to completion of all steps of the operation, indicating the first bitmap image as the last known good bitmap image based on the stored value in response to occurrence of the interruption before all steps of the operation are complete.

\* \* \* \* \*